Dec. 23, 1952　　　　　　　F. HELZ　　　　　　　2,622,924
HOIST FOR VEHICLE DUMP BODIES
Filed Oct. 17, 1949　　　　　　　　　　　　　3 Sheets-Sheet 1
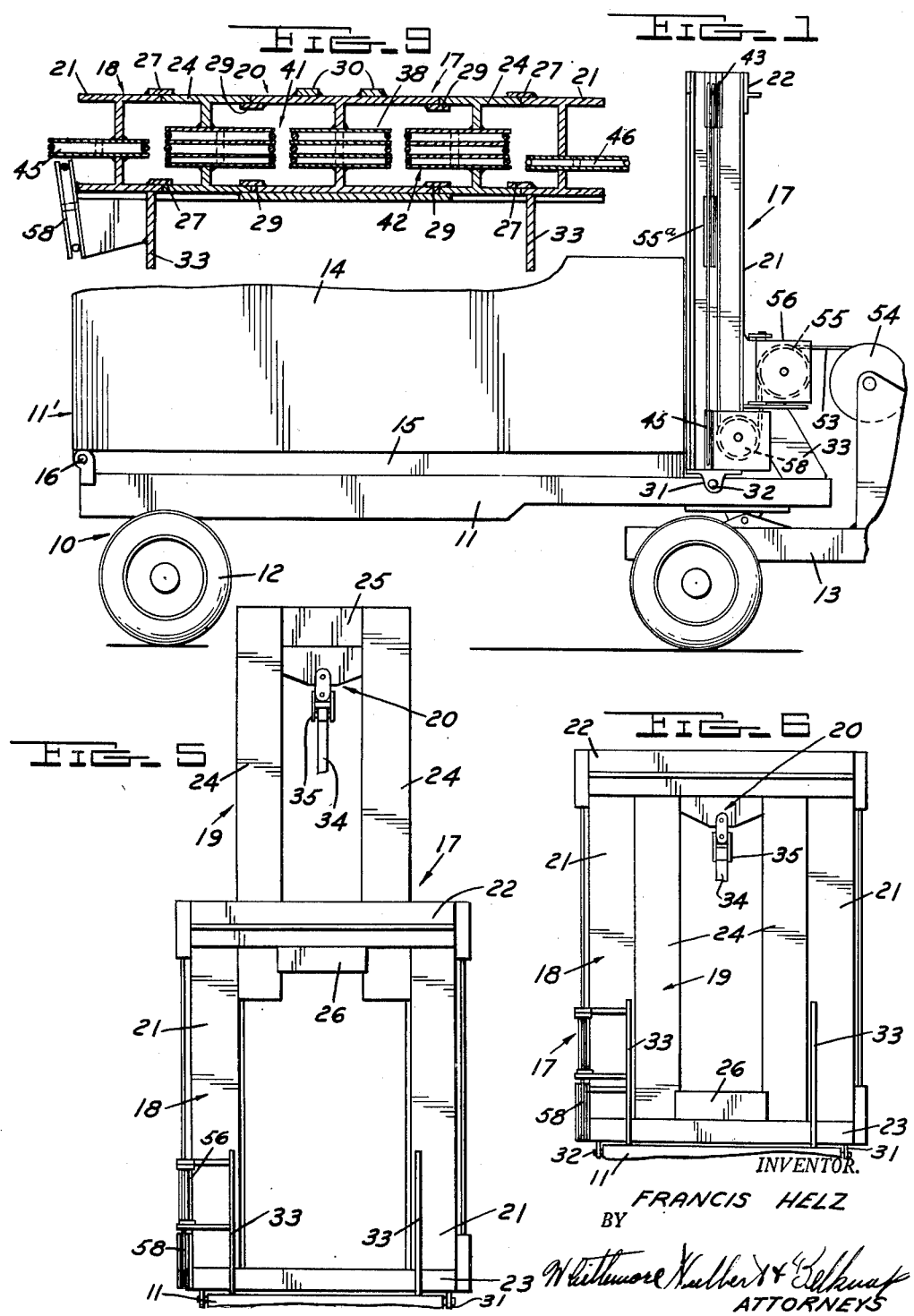

Dec. 23, 1952     F. HELZ     2,622,924
HOIST FOR VEHICLE DUMP BODIES
Filed Oct. 17, 1949     3 Sheets-Sheet 2
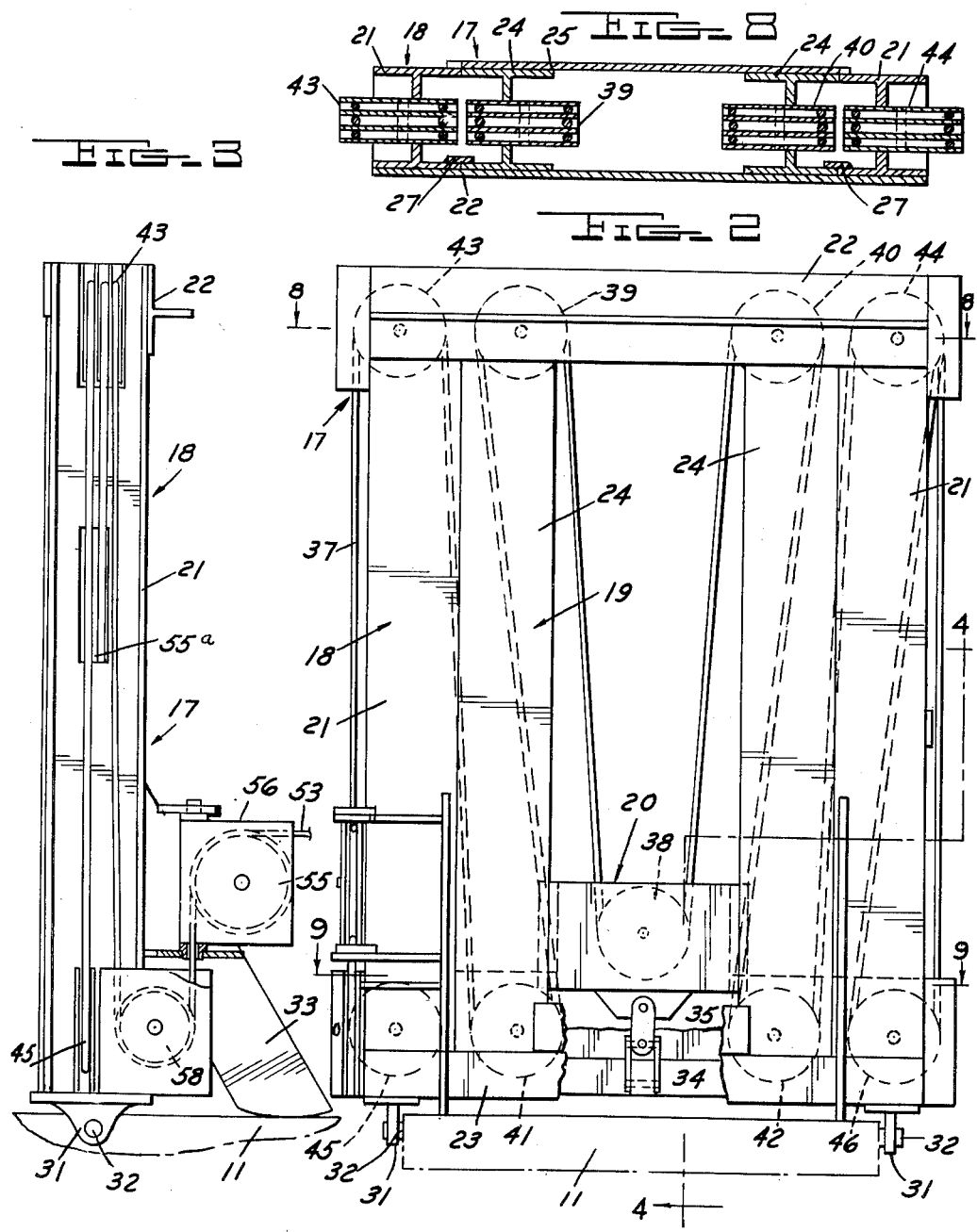
INVENTOR.
FRANCIS HELZ
BY
Whittemore Hulbert & Belknap
ATTORNEYS Dec. 23, 1952            F. HELZ            2,622,924
HOIST FOR VEHICLE DUMP BODIES
Filed Oct. 17, 1949            3 Sheets-Sheet 3
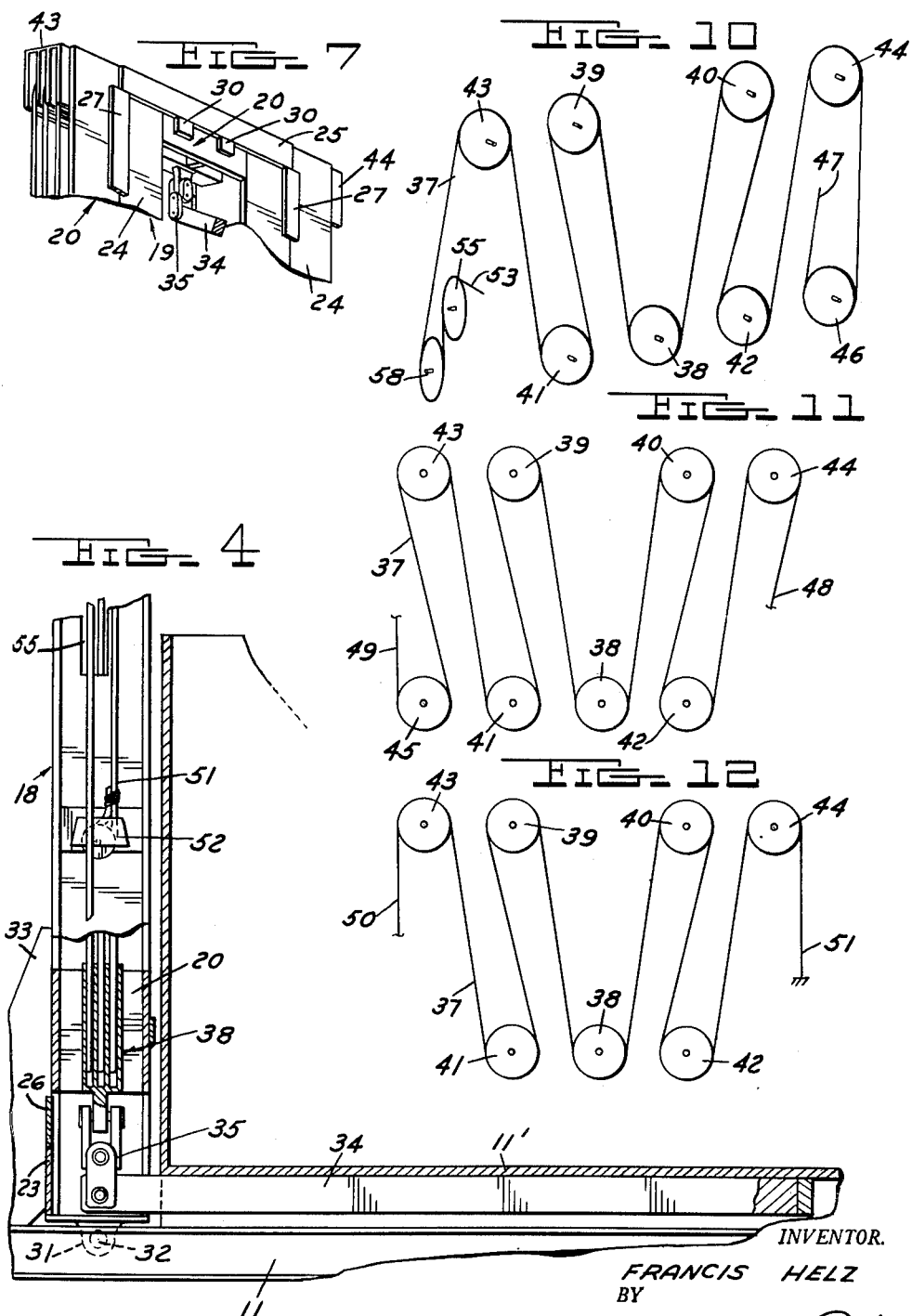
INVENTOR.
FRANCIS HELZ
BY
ATTORNEYS Patented Dec. 23, 1952

2,622,924

UNITED STATES PATENT OFFICE 2,622,924

HOIST FOR VEHICLE DUMP BODIES

Francis Helz, Detroit, Mich., assignor to Contractors Machinery Company, Detroit, Mich., a corporation of Michigan Application October 17, 1949, Serial No. 121,878

5 Claims. (Cl. 298—19)

This invention relates generally to hoists and refers more particularly to improvements in hoists adapted for use in combination with dump type bodies for tilting the latter.

It is an object of this invention to provide a hoist composed of a relatively few simple parts capable of being inexpensively manufactured, assembled and installed on practically any type of vehicle having a tiltable body.

It is another object of this invention to provide a hoist which lends itself to installation in a small space on the vehicle so as not to appreciably reduce space available for payloads, and does not require a special design of body or vehicle chassis construction.

It is a further object of this invention to provide a hoist which, although of reasonable normal height, enables raising one side of the body throughout a substantial distance in order to locate the body at an extremely sharp angle to the chassis frame and thereby facilitate removal of the load by the action of gravity.

The invention has as a still further object to provide a cable operated hoist which enables raising or tilting the body to different elevations relative to the chassis frame.

The foregoing as well as other objects will be made more apparent as this description proceeds, especially when considered in connection with the accompanying drawings, wherein:

Figure 1 is a semidiagrammatic side elevational view of a vehicle having a tiltable body and having a hoist embodying the features of this invention;

Figure 2 is a front elevational view of the hoist having certain parts broken away for the sake of clearness;

Figure 3 is a side elevational view of the hoist shown in Figure 2;

Figure 4 is a sectional view taken substantially on the line 4—4 of Figure 2;

Figure 5 is a front elevational view of the hoist showing the latter in its fully extended position;

Figure 6 is a front elevational view of the hoist showing the latter in an intermediate extended position;

Figure 7 is a fragmentary perspective view of the upper portion of the hoist;

Figures 8 and 9 are respectively sectional views taken on the line 8—8 and 9—9 of Figure 2;

Figures 10, 11 and 12 are diagrammatic views showing the cable for operating the hoist.

It will be understood as this description proceeds that the hoist forming the subject matter of this invention may be advantageously used in connection with any one of a number of different types of vehicles having a tiltable or dump type body. However, for the purpose of illustrating the present invention, I have selected the vehicle diagrammatically shown in Figure 1 of the drawings as comprising a chassis 10 and a body 11'. The chassis 10 has a frame 11 of any suitable construction supported at the rear end by ground engaging wheels 12 and having the front end mounted on a suitable tractor or pulling vehicle indicated generally by the numeral 13.

The body 11' comprises a load storage compartment 14 and a reinforcing frame 15 extending along the bottom of the compartment 14. The frame 15 is adapterd to rest on the chassis frame 11, and is pivoted adjacent the rear end on the chassis frame 11 by a pin 16. The pin 16 extends transversely of the body 11' and enables the front side of the body to be swung upwardly relative to the chassis frame 11.

The body 11' is swung upwardly relative to the chassis frame 11 by a hoist 17 supported in a vertical position on the frame 11 in advance of the front side of the body 11'. The hoist 17 comprises three sections, a first section 18, a second section 19 and a third section 20.

The section 18 is in the form of a rectangularly shaped frame having laterally spaced upright members 21 of I-shaped cross section connected together at the top by a transverse plate 22 and connected at the bottom by a transverse bar 23. The section 19 is also rectangular in shape having laterally spaced side members 24 substantially I-shaped in cross section. The upper ends of the members 24 are connected by a transverse plate 25, and the lower ends of the members 24 are connected by a transverse plate 26.

The section 19 has a length which approximates the length of the section 18, and is adapted to fit in the space provided between the upright members 21 of the section 18 in a manner such that both sections lie in a substantially common plane. It will also be noted that the section 19 is supported for sliding movement vertically or in the direction of length of the section 18, and is guided throughout its sliding movement relative to the section 18 by guide strips 27. The guide strips 27 are shown in Figure 9 of the drawings as welded or otherwise suitably secured to opposite sides of the upright members 21 in positions to respectively slidably engage the inner and outer surfaces of the adjacent upright members 24 on the section 19.

The third section 20 is I-shaped in cross section, and is positioned between the upright members 24 on the section 19 in a manner to occupy a common plane with the sections 19 and 18. The section 20 is slidable relative to the section 19 in the direction to length of the latter, and is guided throughout its sliding movement by guide strips 29 respectively secured to opposite sides of the section 20 in positions to engage the adjacent inner surfaces of the upright members 24. Referring now to Figure 7 of the drawings it will be observed that a pair of lugs 30 are secured to the rear side of the section 29 in positions to engage the bottom edge of the plate 25 on the section 19 when the section 20 is in its uppermost position relative to the section 19, shown in Figure 6 of the drawings.

As briefly mentioned above the hoist 17 is supported on the frame 11 in advance of the front side of the body 11', and for accomplishing this result a pair of brackets 31 are respectively secured to the bottom of the section 18 adjacent opposite sides thereof. When the hoist is positioned on the frame 11, the mounting brackets 31 are located at opposite sides of the frame, and are respectively pivoted to opposite sides of the frame by pins 32. The pins 32 are in axial alignment and the common axis thereof is substantially parallel to the axis of the pin 16 about which the body 11' tilts. Thus the hoist is mounted on the chassis frame for swinging movement to compensate for the arc through which the front side of the body travels during tilting movement of the body. Forward swinging movement of the hoist about the pins 32 is prevented by plates 33 respectively secured to the front sides of the upright members 21 and having the lower ends positioned to abut the chassis frame 11 when the hoist 17 is in its normal or upright position shown in Figures 1 and 3 of the drawings.

Upon reference to Figure 4 of the drawings, it will be noted that a tongue 34 is welded or otherwise suitably secured to the underside of the body midway between opposite sides thereof. The front end of the tongue 34 projects forwardly beyond the corresponding end of the body, and is connected to the third section 20 of the hoist by a suitable coupling 35. The coupling 35 may be of any suitable design which enables relative angular movement between the projecting end of the tongue 34 and the section 20.

With the construction thus far described, it will be noted that when the sections 19 and 20 of the hoist are in their lowermost positions shown in Figure 2 of the drawings, the body 11' is in its normal position on the chassis frame 11. Assuming now that it is desired to tilt the front side of the body in an upward direction, the section 20 is raised relative to the section 19 to the position shown in Figure 6 of the drawings by suitable means to be presently described. Inasmuch as the section 20 is coupled to the tongue 34 on the body, it follows that the body is swung upwardly about the pin 16 to an intermediate elevated position. If this intermediate elevated position is not sufficient to discharge the load in the body, the section 19 is moved upwardly relative to the section 18 to extend the effective length of the hoist, and thereby increase the angle of inclination of the body. In this connection it is pointed out that when the section 20 assumes its uppermost position shown in Figure 6, the lugs 30 on the section 20 abut the cross plate 25 at the top of the section 19, so that continued upward movement of the section 20 moves the section 19 upwardly to extend the hoist 17 shown in Figure 5. In this extended position of the hoist, the plate 26 at the bottom of the section 19 abuts the plate 22 at the top of the section 18 to limit the extent of upward movement of the section 19. When the hoist is fully extended as noted above, the body assumes a sharp angle with respect to the chassis frame 11, and the load in the body is readily discharged by the action of gravity. It will, of course, be understood that when the hoist operating means is released, the sections 19 and 20 are returned or lowered to their normal positions shown in Figure 2 of the drawings by the action of gravity.

In accordance with the present invention the hoist 17 is operated by a cable 37 of substantially continuous length reeved around a number of pulleys arranged on the several sections of the hoist in the following manner. As shown particularly in Figure 2 of the drawings, a pulley 38 is supported on the section 20 of the hoist for relatively free rotation. Additional pulleys 39 and 40 are rotatably supported on the upper end of the section 19 at opposite sides of the path of travel of the section 20. A similar pair of pulleys 41 and 42 are respectively rotatably supported at the lower end of the section 19 on opposite sides of the path of travel of the section 20. A pair of pulleys 43 and 44 are respectively rotatably supported at the upper end of the section 18 on opposite sides of the path of travel of the section 19. An additional pair of pulleys 45 and 46 are respectively rotatably supported on the lower end of the section 18 at opposite sides of the path of travel of the section 19. As shown in Figures 8 and 9 of the drawings, all of the pulleys noted above are located within slots formed in the webs of the respective I-shaped members, and the pulley casings are welded or otherwise secured to the respective webs.

It will further be noted that all of the pulleys with the exception of the pulleys 45 and 46 are of the gang type, and in the present instance, are each formed of three individual pulleys mounted in axial alignment. The manner in which the cable 37 is reeved around the individual pulleys of each gang is shown diagrammatically in Figures 10 to 12 inclusive. In considering the above figures in the drawings, it is to be understood that the end 47 of the cable shown in Figure 10 is integrally connected to the end 48 of the cable shown in Figure 11, and the extremity 49 of the cable shown in Figure 11 is integrally connected to the end of the cable 50 shown in Figure 12 of the drawings. The end portion 51 of the cable shown in Figure 12 is secured to a part of the section 18 by an anchor 52 in the manner shown in Figure 4 of the drawings. The opposite end portion 53 of the cable is shown in Figure 10, and is wound around an operating drum 54 diagrammatically shown in Figure 1 of the drawings and adapted for connection to suitable power operated means in a manner not shown herein. The cable from the operating drum 54 extends over a pulley 55 rotatably supported on a bracket 56 shown in Figure 3 of the drawings as pivoted to the section 18 of the hoist for rocking movement about a vertical axis to compensate for different angular positions of the end portion of the cable 53. The cable extends downwardly from the pulley 55 and is reeved around a pulley 58 shown in Figure 9 of the drawings as rotatably supported on a bracket, which in turn is secured to the section 18 of the hoist. The cable is extended upwardly from the pulley 58 and is reeved over the first pulley section of the gang 43. The cable continues in a downward direction around the underside of the first pulley unit of the gang 41, and extends upwardly around the first pulley unit of the gang 39 to the corresponding pulley unit of the gang 38 on the section 20 of the hoist. From the pulley 38 the cable is extended upwardly around the first pulley section of the gang 40 and is directed downwardly around the first pulley section of the gang 42. The cable extends upwardly from the pulley 42 around the first pulley section of the gang 44, and is projected downwardly around the single pulley 46 on the section 18. From the pulley 46 the cable is extended back upwardly around the second pulley unit of the gang 44 in the manner indicated in Figure 11 of the drawings. After the cable is reeved around the second pulley sections of the several gangs, it is returned around the third pulley sections in the manner noted in Figure 12 of the drawings. Owing to this cable arrangement, it is necessary to pass the cable transversely of the upright frame members and where this is required, the web portions of the frame members are formed with clearance slots 55ª, one of which is shown in Figure 3 of the drawings. The purpose of providing three passes of the cable is to enable extremely heavy loads to be accommodated by the hoist, and it will be understood that in instances where the hoist is used for lighter duty work, the number of passes may be reduced, if desired.

Regardless of the number of passes of the cable incorporated in the hoist, it will be understood that rotation of the drum 54 in a clockwise direction applies a pull on the cable, and causes the section 20 of the hoist to rise relative to the section 19. As stated above the section 20 moves upwardly into contact with the top rail or plate 25 of the section 19, and continued operation of the drum 54 imparts an upward movement to the section 19. Thus the effective length of the hoist is increased by an amount corresponding generally to the length of the section 19, as shown in Figure 5 of the drawings.

What I claim as my invention is:

1. A hoist comprising a generally vertically extending first section having laterally spaced upright members connected to the adjacent opposite ends, a second section positioned between the upright members and having laterally spaced upright members respectively slidably engaging the upright members of the first section and also connected together, a third section positioned between the upright members of the second section and having the opposite vertical edge portions respectively slidably engaging the upright members of the second section, and hoisting means for said sections comprising a pulley on the third section, a pair of pulleys supported on the second section at each side of the third section with the pulleys of each pair respectively located adjacent the top and bottom of the second section, a pulley supported on the first section at each side of the second section and positioned adjacent the top of the first section, a flexible linear member having an intermediate portion extending around the bottom of the pulley on the third section and upward therefrom over the pulleys at the top of the second section, then downward around the under side of the pulleys at the bottom of the second section and upward over the pulleys of the first section, one end of said flexible linear member being anchored, and a winding drum connected to the opposite end of said member.

2. In combination with a vehicle frame structure and a body supported on the frame structure for tilting movement of the body in an upward direction, a hoist having a generally vertically extending section positioned adjacent the upwardly movable side of the body and pivoted at its lower end on the frame structure for swinging movement about an axis extending substantially parallel to the axis of tilting movement of the body, said section having laterally spaced upright frame parts, a second section positioned between the frame parts of the first section having laterally spaced upright frame parts respectively vertically slidably engaging the first section frame parts to extend the effective height of the latter, a third section connected to the side aforesaid of the body and positioned between the frame parts of the second section, said third section having the opposite vertical edges thereof respectively slidably supported by the frame parts of the second section for upward movement relative to the second section, and means for raising the third and second sections in succession relative to the first section including a winding drum, a pulley mounted on said third section and pulleys mounted at both upper and lower ends of said first and second sections, a continuous cable extending successively about said pulleys and to said winding drum, and means at the top of the second section for engagement with the third section as the latter approaches the top of the second section to raise the second section upon continued upward movement of the third section.

3. The combination set forth in claim 2, in which the pulleys on the first and second sections are supported in pairs at the top and bottom portions respectively of the first and second sections at opposite sides of the third section, and in which said cable has an intermediate portion reeved around the underside of the pulley on the third section with the portions at opposite sides of the intermediate portion extending upwardly over the pulleys at the top of the second section and extending downwardly around the undersides of the pulleys at the bottom of the second section, the end portions of said cable extending upwardly from the pulleys at the bottom of the second section and reeved over the pulleys at the top and bottom of the first section, means for anchoring one end of said cable to the first section, and means connected to the other end of said cable for applying a pull on the same.

4. The combination set forth in claim 3, in which the upright parts are slotted to enable passing said cable therethrough.

5. A hoist comprising a generally vertically extending first section having laterally spaced upright members connected to the adjacent opposite ends, a second section positioned between the upright members and having laterally spaced upright members respectively slidably engaging the upright members of the first section and also connected together, a third section positioned between the upright members of the second section and having the opposite vertical edge portions respectively slidably engaging the upright members of the second section, and hoisting means for said sections comprising a pulley on the third section, a pair of pulleys supported on the second section at each side of the third section with the pulleys of each pair respectively located adjacent the top and bottom of the second section, a pair of pulleys supported on the first section at each side of the second section with the pulleys of each pair respectively positioned adjacent the top and bottom of the first section, a flexible linear member having an intermediate portion extending around the bottom of the pulley on the third section and upward therefrom over the pulleys at the top of the second section, then downward around the under side of the pulleys at the bottom of the second section and upward over the top pulleys of the first section and downward under the pulleys at the bottom of said first section, one end of said flexible linear member being anchored, and a winding drum connected to the opposite end of said member.

FRANCIS HELZ.

REFERENCES CITED

The following references are of record in the file of this patent:

UNITED STATES PATENTS

| Number | Name | Date |
|---|---|---|
| 900,979 | Brown | Oct. 13, 1908 |
| 1,352,884 | Emory | Sept. 14, 1920 |
| 1,728,460 | Weber et al. | Sept. 17, 1929 |
| 1,925,296 | Barrett | Sept. 5, 1933 |

FOREIGN PATENTS

| Number | Country | Date |
|---|---|---|
| 8,090 of 1927 | Australia | July 4, 1927 |